United States Patent [19]
Cho et al.

[11] 3,914,607
[45] Oct. 21, 1975

[54] THICKNESS MEASURING APPARATUS AND METHOD FOR TIRE PLY AND SIMILAR MATERIALS

[75] Inventors: Boong Youn Cho; Orval L. Utt, both of Columbus, Ohio

[73] Assignee: Industrial Nucleonics Corporation, Columbus, Ohio

[22] Filed: Dec. 12, 1973

[21] Appl. No.: 423,921

[52] U.S. Cl. ............... 250/308; 250/359; 250/385
[51] Int. Cl. .............................................. G01t 1/16
[58] Field of Search ............ 250/308, 360, 359, 385

[56] References Cited
UNITED STATES PATENTS
3,405,267   10/1968   Chope ............................ 250/308
3,742,217   6/1973   Eakman ......................... 250/308

Primary Examiner—Harold A. Dixon
Attorney, Agent, or Firm—William T. Fryer, III; C. Henry Peterson; Munson H. Lane, Jr.

[57] ABSTRACT

Apparatus and method for measuring the thicknesses of material on opposite sides of the reinforcing cord disposed within a tire ply, the material of the reinforcing cords having a high effective atomic number relative to the atomic number of the material applied to the opposite sides of the cords. Sources of X-ray radiation on opposite sides of the tire ply are directed at the tire ply. Radiation detectors on opposite sides of the ply having optimum sensitivity to backscatter radiations, produce first and second signal outputs, each of which have components functionally related to the thicknesses of the material on both sides of the reinforcing cords. Processing circuits are provided which process the first and second signals so that the first and second signals each are related to the thicknesses of material on both sides of the ply. Solution networks combine the processed signals to obtain third and fourth signals, the third signal being representative of the thickness of material on one side of the cord and substantially independent of changes in the thickness of rubber on the opposite side of the cords, and the fourth signal being representative of the thickness of material on the opposite side of the reinforcing cord and substantially independent of changes in the thickness of rubber on the other side of the cords. Optional apparatus for summing, subtracting and taking the ratio of the third and fourth signals to indicate the combined thickness of material on both sides of the cord, the difference of the thickness of material on one side of the ply compared to the other, or balance, and the cord position within the ply are provided.

26 Claims, 5 Drawing Figures

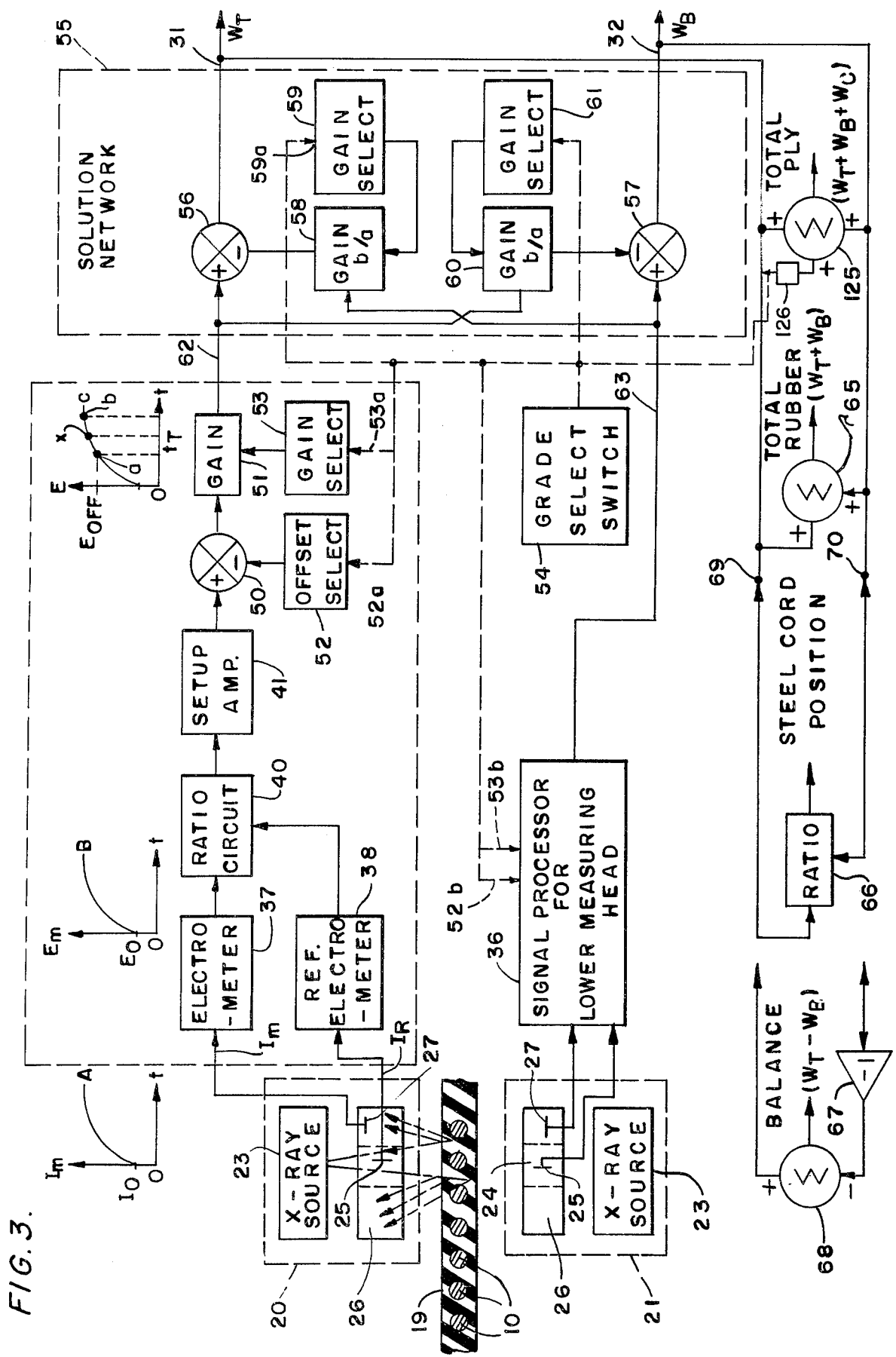

3,914,607

THICKNESS MEASURING APPARATUS AND METHOD FOR TIRE PLY AND SIMILAR MATERIALS

BACKGROUND

The invention relates to method and apparatus for measuring the amount of material on opposite sides of the reinforcing cord of a tire ply, and more particularly relates to a backscatter X-ray radiation gauging apparatus and method for obtaining the aforesaid measurements.

As automobile tire manufactures tool up for making steel belted tire plys, there is an increasing interest in the measurement of the amount of rubber on each side of the steel cords. In combination with the desire to know the amount of rubber on each side of the steel cords, there is also a need to determine the total amount of rubber on the ply (by proper summing of the results of the measurement of each side of the ply) and to determine the relative position of the steel cords within the ply (by proper ratioing of the results of the measurement of each side of the ply).

Previous methods and apparatus for measuring the position of an inner layer of material within a tire ply are disclosed by the following patents representative of the prior art.

U.S. Pat. No. 3,405,267, William E. Chope, Oct. 8, 1968

U.S. Pat. No. 3,754,138, Kurstedt, et al., Aug. 21, 1973

U.S. Pat. No. 3,405,267 discloses the use of a pair of backscatter radiation gauges on opposite sides of a tire ply for determining the position in a sheet of one material of an intermediate layer of a different material. While recognizing that each backscatter gauge is examining a three-layer fabric and not only the cord layer and that rubber coating nearest the surface but also the undercoating may contribute to the response of each detector, the method and system disclosed in U.S. Pat. No. 3,405,267 is described in terms of a simplifying assumption that each detector "sees" radiation backscattered only from the cord and that layer of rubber immediately adjacent the detector. Such an assumption is valid only when the cords are heavy enough to substantially absorb the backscatter radiations from the material on the side of the ply opposite the detector. To avoid consideration of the more complex three layer response, U.S. Pat. No. 3,405,267 states that examination of plys having extremely light cord weight should be avoided. U.S. Pat. No. 3,405,267 is concerned more with the determination of the relative position of an inner layer between outer layers of a different material than with accurate determination of the thickness of material on each side of the ply. Hence the only specific embodiment illustrated in U.S. Pat. No. 3,405,267 employs a ratio indicator and a deviation meter which may be used alternatively to indicate relative position of the cord in the ply, and the deviation of the cord from a center position.

U.S. Pat. No. 3,754,138 discloses a method and apparatus for measuring the position of a layer disposed within a tire ply which includes the direction of radiations from a source at the tire ply to cause fluorescence of the layer. Radiation detectors on opposite sides of the tire ply are sensitive to fluorescence energy produced at the layer. Signals produced by the detector are compared to produce a signal indicative of the position of the layer within the tire ply.

The present invention is an improvement within the method and apparatus of U.S. Pat. No. 3,405,267 in that it provides a method and means for measuring and indicating the amount of material on each side of an inner layer of reinforcing cord using radiation gauges on each side of the ply whose response is made up of contributions from the layers of material on both sides of the cord. The present invention provides a solution network which combines the signals derived from the opposite gauges to form a simultaneous solution of equations having variables representing the amount of material on each side of the cord. A pair of signals from the solution network are representative of the thicknesses of material on the two sides of the reinforcing cord.

The present invention distinguishes from the teaching of U.S. Pat. No. 3,754,138 in that an entirely different radiation measurement technique is used.

The pending application of Orval L. Utt and Howard J. Evans, Ser. No. 181,836, filed Sept. 20, 1971, entitled Coating Thickness Gauge and which is assigned to the same assignee as is the present application is referenced to because of some similarities in apparatus. Application Ser. No. 181,836 however, relates to the measurement of coating thickness on a metal substrate using a detector responsive to energy from fluorescence energy derived at the subtrate coating.

Theoretical considerations of the various material interaction methods for determining the amount of rubber on a steel belted ply suggests that X-ray backscatter perhaps, forms the preferred type of measurement. This simply implies that of the various kinds of measurement, each has both certain advantages and certain disadvantages. However, in the final considerations, the X-ray backscatter seems to be emerging as the method most applicable toward the end results needed in this measurement. Both beta backscatter and X-ray fluorescence techniques of metalic belt or cord position measurements have certain disadvantages. The X-ray fluorescence technique may suffer from poor signal-to-noise ratio. Even for a relatively low-energy X-ray source, rubber is a good scatterer. Since the intensity of characteristic X-rays from the metallic cord or belt is rather low, the intensity of radiation scattered from the rubber may significantly degrade the measurement even for a detector with a certain degree of energy selectivity. Compared with the beta backscatter technique, the proposed X-ray method has better sensitivity and flexibility. The intensity of backscattered beta radiation is approximately proportional to the atomic number of the backscattering medium; whereas the absorption coefficient of low-energy X-rays is proportional to the fourth power of the atomic number. The X-ray technique permits the selection of optimum energy for the thickness range of measurement and provides high intensity obtainable from a tube X-ray source. If high intensity is not required, an isotopic X-ray, gamma ray, or bremsstrahlung source may be used for simplicity, reliability and stability. For this invention the term X-ray is used to include X-rays generated from a tube X-ray source, from an isotopic source, gamma rays from an isotopic source and bremsstrahlung radiation. This disclosure assumes that the X-ray backscatter is the method used to make the required measurements of the tire ply and discloses a system for implementing the measurement.

The prior art to our knowledge has not developed a method or apparatus using backscatter X-ray radiation techniques suitable for accurately determining the thicknesses of rubber on opposite sides of steel reinforced tire ply.

It is thus an object of this invention to provide apparatus and method for determining the thicknesses of rubber on opposite sides of steel reinforcing cord within a tire play. The term rubber as used in this disclosure is used generically to include both natural and synthetic rubbers as used in the tire industry to produce tire plies having an inner reinforcing layer coated on opposite sides with layers of rubber.

It is another object of this invention to provide a method and apparatus for determining the amount of one material on opposite sides of reinforcing cords of a second material, the material of the reinforcing cords having a high effective atomic number relative to the effective atomic number of the material applied to the opposite sides of the reinforcing cord. It is within the scope of this invention that the reinforcing cords may be independent cords or woven materials comprising interwoven cords.

These and other objects and advantages of the present invention will become apparent upon reference to the following description.

SUMMARY OF THE INVENTION

The invention provides apparatus and method of measuring the thicknesses of the layers of rubber applied to opposite sides of a tire ply. For this invention, the terms thickness and weight will be used interchangeably when describing measurement of the rubber, since weight measurement of a material with a constant density is equivalent to a thickness measurement. The industry prefers to use the thickness term. The measurement is normally made upon a continuously moving ply on the downstream side and in close proximity to ply forming apparatus as commonly found in tire ply manufacturing plants in order that corrective actions may be made manually or automatically upon the ply forming apparatus to assure a uniform quality product.

Backscatter radiation gauges, each comprising an X-ray radiation source and a backscatter radiation responsive detector are positioned on the opposite sides of the ply in position to direct primary radiations from the sources into the ply. As the radiations proceed through the ply, the backscatter radiations are produced first from the layer of material nearest the sensor, next from the inner layer of reinforcing cord having material from the outer layers filling the spaces between the cords, and finally from the layer of material on the side opposite the sensor. Each of the radiation detectors produces a signal which may be considered to comprise components derived from the backscatter from the layer on the sensor side, from the reinforcing cord layer, and from the layer on the side opposite the sensor. The signal component derived from the layer on the sensor side is functionally related to the thickness of the layer times a sensitivity factor, $a$, which is a constant for a particular tire ply and is predetermined in preliminary field tests for the various grades of ply which to be manufactured. The signal components derived from the layer on the side opposite the sensor is functionally related to the thickness of the layer times a sensitivity factor, $b$, which also is a constant for a particular tire ply and is predetermined in preliminary field tests for the various grade of ply to be manufactured. The ratio of $b/a$ will vary with the size and closeness of the cords. If the cords are large and close together so that they touch each other, $b/a$ will approach zero because the steel cords will prevent any backscatter radiations from the side of the ply opposite the sensor. If the cords are small and are spaced apart, then $b/a$ increases and would approach 1 for a ply having low effective atomic number reinforcing cords, relative to the effective atomic number of the material applied to the opposite sides of the reinforcing cord.

The signal component derived from the backscatter of the inner layer is substantially a constant value for a given ply and will be substantially the same for both detectors. Optimum insensitivity to composition changes of the material coating the reinforcing cord is obtained by proper choice of the energy level of the primary radiations from the X-ray sources.

The apparatus includes means to assure stability of the signals derived from the measuring heads against fluctuation in the source of energy. It further includes means for standardizing the system to assure repeated response to the same samples. In addition it includes means for providing predetermined offset signals and subtracting the offset signals from the standardized signals derived from each gauge. The different signals thus produced are multiplied by selected gain factors in variable gain amplifiers. Signals from the opposite gauges processed in the aforesaid manner are fed to a solution network in which the signals are manipulated to solve a pair of equations relating the processed signals to the thicknesses of material on opposite sides of the ply for the unknown thicknesses. A multiposition grade select switch is provided to set in constant values which vary with each grade of ply which it is anticipated the apparatus of the invention will measure. The grade for a particular ply relates to its total ply thickness, number of wires per inch and the wire size. A 10 position switch having stored inputs at each position for a particular one of ten ply grades is illustrative. The inputs to the grade switch are made during preliminary field runs when setting up the equipment.

Once signals representing accurate determinations of the thicknesses of material on opposite sides of the ply have been obtained, the signals may be combined by means of a ratio computer and indicator to indicate the relative position of the cord layer within the ply. A ratio indication of unity will correspond to a centrally located cord layer while indications of greater or less than unity will indicate the degree to which the cord layer is located to one side or the other of the center of the ply.

The total thickness of the layers on opposite sides of the reinforcing cord are obtained by summing the two signal outputs from the solution network in a summing amplifier.

An indication of the difference in the coating thickness on opposite sides of the ply may be obtained using apparatus for subtracting the signal representing the thickness on one side from the signal representing the thickness on the other side of the ply.

Other objects and advantages of the invention will become more apparent from the following description and drawings in which:

FIG. 3 is a block diagram of the system shown in FIG. 1 illustrating in greater detail the measuring techniques of the present invention; and, FIG. 4 is a block diagram showing in greater detail the set up amplifier illustrated in FIG. 3.

DETAILED DESCRIPTION OF THE DRAWINGS

Figure 1:
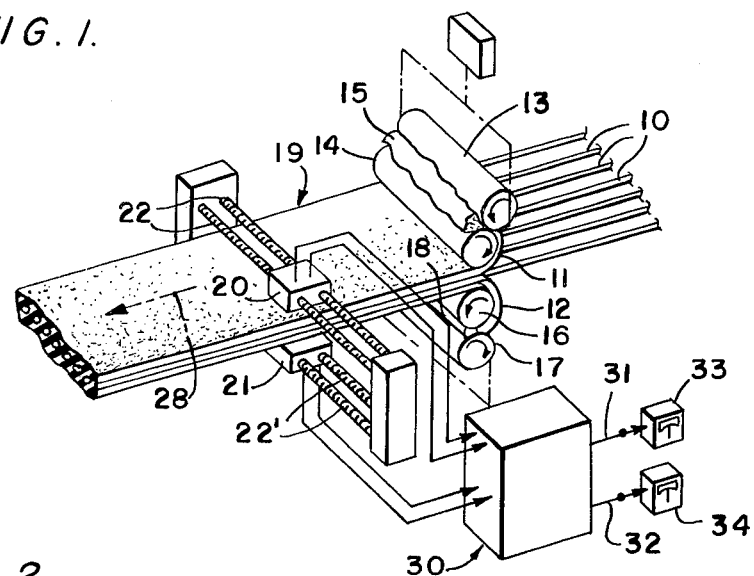
FIG. 1 is a perspective view of a cord reinforced tire ply manufacturing process measured for the thicknesses of material on opposite sides of the reinforcing cord.

Referring to the drawings and particularly to FIG. 1, there is shown a typical two calender train for making calendered fabric for use in the manufacture of automobile tires. Reinforcing cords 10, typically steel wires, are fed from supply reels and alignment mechanism (not shown) in substantially equally spaced, parallel alignment between top and bottom layers 11 and 12, of gum rubber or the like, which are fed from upper and lower calender stands respectively. The upper calender stand comprises upper and lower calender rolls 13 and 14 which are adjustable relative to each other to provide the desired spacing between them in order that the top layer of rubber 11, calendered from an accumulation of rubber 15 on one side of the stand, will have a predetermined thickness. Likewise the lower calender stand comprises upper and lower calender rolls 16 and 17 which are adjustably spaced relative to each other to provide the desired spacing between them in order that the bottom layer of rubber 12 will have a predetermined thickness. The reinforcing cords 10 and rubber layers 11 and 12 are compressed between the lower roller 14 of the upper calender stand and the upper roller 16 or the bottom calender stand whereupon the top and bottom layers of rubber are forced to fill the interstices between the cords 10 and to form a united cord reinforced rubber ply 19 which emerges in the direction of the large arrow for further processing.

In accordance with the present invention, a pair of similar X-ray radiation backscatter gauges 20 and 21 are mounted adjacent to opposite surfaces of the cord reinforced ply 19, preferably on upper and lower traversing mechanism 22, 22' respectively which are adapted to scan the continuously moving ply 19 in a well known manner.

The gauges 20 and 21 each have a reference detector sensitive to the primary radiations from a highly stable X-ray source and a measuring detector which is sensitive to backscatter radiations from the ply 19. Reference and measured signals from each of the gauges 20 and 21 are fed into a signal processing and mathematical computational apparatus 30 to obtain a pair of output signals, one signal representative of the thickness of rubber on one side of the reinforcing cords 10 and the other signal representative of the thickness of rubber on the opposite side of the reinforcing cords. Since the rubber being applied to the cords 10 has a substantially constant density, the signals obtained from the apparatus 30 are related to the weight on respective sides of the reinforcing cords 10 by a constant density factor $p$. The signal transmitted over line 31, representative of the rubber thickness on the top side of the ply 19 is applied to a meter 33 which may be calibrated either in units of rubber thickness, or rubber weight. Similarly, the signal transmitted over line 32, representative of the rubber thickness on the bottom side of the ply 19, is shown being applied to a meter 34 which likewise may be calibrated either in units of rubber thickness or total rubber weight and the total ply weight of thickness can be indicated by adding to the sum a suitable weight or thickness for the cords; they may be applied to a ratio meter to obtain an indication of cord position within the rubber, or they may be subtracted to obtain a balance signal indicative of the difference in rubber thickness on the opposite sides of the reinforcing cords. The signal processing and mathematical computation apparatus 30 will be subsequently described in conjunction with FIG. 3 of the drawings.

Figure 2:
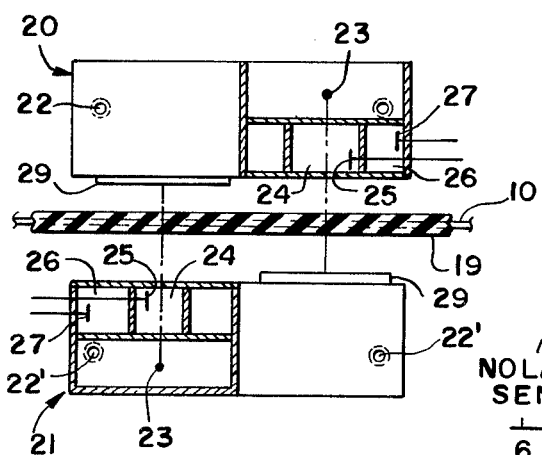
FIG. 2 is an enlarged end view of the measuring heads illustrated in FIG. 1 showing right and left hand portions of the top and bottom heads respectively in vertical section.

In FIG. 2, the X-ray gauges 20 and 21 are illustrated as comprising a continuous beam X-ray point source 23, a reference ionization chamber 24 housing a reference electrode 25, and a measuring ionization chamber 26 housing a measuring electrode 27. The chambers 24 and 26 are individually closed and each contains an ionizable inert gas such as argon, krypton and xenon chosen for optimum detection sensitivity. Krypton is preferred because of its higher detection efficiency and lower relative cost. Chambers 24 and 26 are covered by thin stainless steel windows which are substantially non-absorbing of the primary and backscatter radiations used in this invention but which shield the chambers from the effect of fluorescent radiations. As will be seen from FIG. 2, the X-ray source 23 and chambers 24 and 26 of the upper measuring head 20 are offset from the like components of the lower measuring head 21 in a longitudinal direction relative to the movement of the ply 19 (indicated by arrow 28) in order to prevent the radiations from one head affecting the other head. On the side of the ply opposite each radiation source 23 is provide an absorber or back plate 29 for absorbing radiations transmitted through the ply 19. The back plates 29 have a second function for standardizing subsequently to be described.

The heads 20 and 21 are aligned abreast so that a line through the centers of the pair of heads moves across the ply 19 in a substantially parallel relationship to a longitudinal edge of the ply. In order to minimize abrupt changes in signal as the radiation beams from the heads 20 and 21 traverse the individual reinforcing cords 10, the radiation beams are preferably circular, oval or of some other cross-section configuration other than rectangular. A rectangular beam having 1 edge parallel with the cords 10 would be particularly cord sensitive and is to be avoided. In contrast beams having smaller width through their center, taken along a line parallel to the edge of the ply 19, than through their leading and trailing edges are less cord sensitive and are preferred over a rectangular spot. A circular spot has been found to be satisfactory and in consequence the ionization chamber 24 is preferably cylindrical and is provided with circular windows, while the ionization chamber 26 is annular and coaxial with the ionization chamber 24.

The density of the inert gases within the chambers 24 and 26 affects the radiation sensitivity of the gauges. The pressure in the center chamber 24 is preferably low in order to prevent excessive attenuation of the primary X-ray radiation from the source 23. While the pressure in the measuring chamber is substantially higher in order to prevent the backscatter radiation from passing through the chamber without detection in significant amount. The pressure and type of gas in the measuring chamber sensitive to the backscatter radiation which is approximately of the same energy level as the primary radiation.

The X-ray source 23 is preferably a highly stable source, such as a well regulated machine X-ray source, or an isotope source. Since an isotope source is completely stable the reference detector 24 would not be required. While isotope sources may be used to make the measurement, a machine X-ray source is preferred as it is capable of generating significantly more intense radiations than currently available isotope sources. Moreover, the radiation energy may be selected from optimum measurement sensitivity. In the case that a fast system response and high accuracy are not required, an isotope source may be used in connection with a counting type detector, such as a scintillation-photomultiplier tube or a proportional counter. In this embodiment, the electrometer 37 and ratio current 40 would be replaced with a pulse amplifier, threshold detector and a pulse averaging circuit.

In a preferred embodiment, the energy level of the X-ray radiations should reduce relative sensitivity of the gauges 20 and 21 to composition changes of the material applied to the cords 10. The higher the energy, the less composition sensitivity. The energy should provide substantial absorption by the cords. The lower the energy the more absorption. The chosen energy is the result of a compromise, using these guidelines, for a given process application. Energy levels within the range of from approximately 25 to 60 KEV are given by way of example as satisfactory for use in measuring the thickness of rubber on opposite sides of steel reinforcing cords with small $b/a$ ratios and minimum sensitivity to composition changes.

Considering now only the top measuring head 20, and X-ray beam of selected energy level is transmitted from the source 23 through the reference chamber 24 prior to impinging upon the ply 19. The inert gas present in the chamber 24 is ionized in response to energy absorbed thereby from the X-ray beam in the presence of a collecting potential. The gas absorbs only a small portion of the energy of the beam derived from source 23 so that the beam passes through the chamber 24 with a very small degree of attenuation. The reference electrode 25 derives a signal current having a magnitude indicative of the intensity of the beam derived from source 23.

After passing through the reference chamber 24, the X-ray beam irradiates the ply 19 producing backscatter radiation as it proceeds through the ply. The backscatter radiation entering the chamber 26 ionizes the gas within the chamber and a signal current having a magnitude proportional to the amount of ionization of the gas within the chamber is derived on the measuring electrode 27.

In the same manner reference and measurement signal currents are derived in the lower measuring gauge 21 on the electrodes 25 and 27 respectively.

The measurement electrode 27 in the upper head 20 responds to backscatter energy reaching the chambers 26 to derive as output signal in accordance with:

$$I_{m(top)} = I_o [1 + k(1 - e^{-(at_t + bt_b + F)(1-gc)})] \qquad (1)$$

$I_m$ is the current derived from the sensor,
$I_o$ is the current derived by the sensor for a ply having a zero thickness of rubber on the cords 10,
$k$ is a proportionately constant,
$e$ is the base of natural logarithms,
$a$ is the sensitivity of the measurement to rubber on the sensor side of the cords,
$b$ is the sensitivity of measurement to rubber on the side of the cord opposite the sensor,
$t_t$ is the thickness of the rubber on the top side of the cord,
$t_b$ is the thickness of the rubber on the bottom side of the cord,
$F$ is a factor representative of the rubber between the steel cords,
$c$ is a composition factor of the rubber varying with materials in the rubber layer other than rubbers, such as zinc, and,
$g$ is a factor which relates the composition factor to the units of measurement.

Similarly the measurement electrode 27 in the lower head 21 responds to the radiation energy reaching the chamber 26 to derive an output signal in accordance with:

$$I_m(Bottom) = I_o [1 + k(1 - e^{-(at_b + bt_t + F)(1-gc)})] \qquad (2)$$

where the terms in the equation are as indicated above with respect to equation 1.

The measurement signals and the reference signals from the backscatter gauges 20 and 21 are fed to signal processor sections 35 and 36 respectively of the apparatus indicated at 30 in FIG. 1. In further discussion of the signal processor sections 35 and 36 and other sections of the apparatus 30 reference will be made to FIG. 3, wherein, the apparatus represented by the box 30 in FIG. 1 is illustrated by block diagram. Since the signal processors 35 and 36 for upper and the lower measuring heads are similar, only the signal processor for the upper measuring head will be described in detail and it will be understood that the signal processor for the lower measuring head (illustrated by block 36 in FIG. 3) is composed of like components.

In equations 1 and 2, the terms $I_o$ are subject to variation due to drifting of the X-ray source 23 when the source is a machine X-ray source rather than an isotope source. Drifting of the sources 23 occurs even though the power supply for the source is current regulated. to prevent the drifting of the sources 23 from affecting the accuracy of the measurement signal derived by the detector 26, the current levels derived by electrodes 25 and 27 are combined in ratio circuit 40 after having been converted into voltage levels by electrometers 37 and 38 respectively. Electrometers 37 and 38 include the usual high impedance resistor and a low pass filter circuit to substantially eliminate variation of the amplitudes of the currents derived by electrodes 25 and 27 in response to statistical variations of the X-ray beam derived from source 23. The output signal of ratio circuit 40 has the same form as equation 1 except that the value of $I_o$ is stabilized due to the output of electrometer circuit 37 being divided by the output of electrometer 38. The signal from electrometer 38 is derived from the current $I_R$ produced by the reference detector 24.

STANDARDIZATION

The signal from the ratio circuit 40 is fed into a set up amplifier 41 which is provided for standardization.

Figure 4:
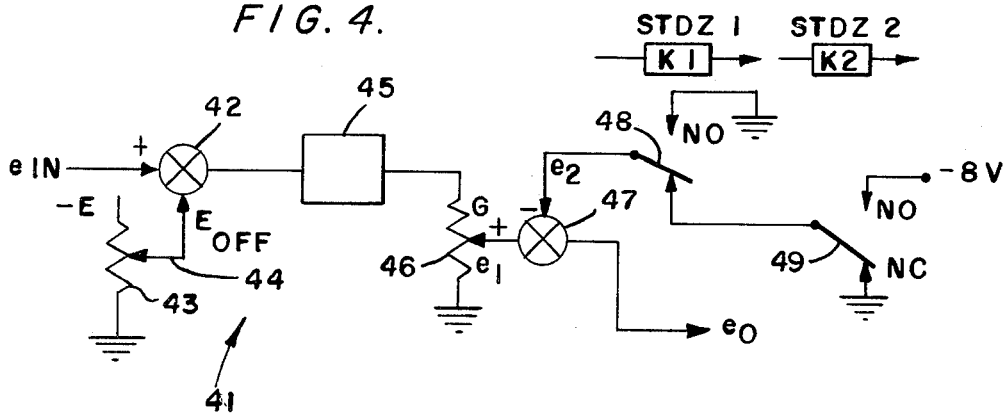

Since the values of the circuit components within the signal processor may vary with time, it is necessary to provide means for periodically standardizing the system in order to make the system response repeatable. FIG. 4 illustrates a standardization circuit suitable for use in this invention which includes a summing network 42, a variable gain amplifier network including an amplifier 45 and a potentiometer 46, a summing network 47, and first and second standardizing relays K1 and K2. The summing network 42 subtracts a selected negative offset voltage derived from the slider 44 of a potentiometer 43 connected between a negative voltage −E and ground. The gain G of the variable gain amplifier 45 is adjusted by varying the position of the slider of potentiometer 46.

In performing standardization, two different standard samples are used. The first sample representing a ply with little or no rubber on the reinforcing cord, and the second sample representing a ply having approximately the maximum ruber thickness which the gauges will encounter. It is not necessary that the samples be actual sections of reinforcing cord with minimum and maximum thicknesses of rubber. Instead it has been found suitable for this invention to use the back plates 29 as the first sample and to use a steel plate coated with a selected thickness of mylar as the second sample. Since the gauges 20 and 21 must be standardized alike an identical pair of the first sample are provided, one sample for each gauge. Similarly, an identical pair of the second sample are provided.

The first step of standardization is performed with the measuring gauges 20 and 21 moved off the ply 19, and with the standardize relay K1 energized and the standardize relay K2 deenergized thus setting the voltage $e_2$ equal to zero. The X-ray beam from the sources 23 in each gauge will then impinge directly on the first sample (i.e., back plate 29) of the opposite gauge. The slider 44 of the offset select potentiometer 43 is adjusted until a negative voltage, $E_{OFF}$, is selected which when subtracted from the incoming signal $e_{in}$ by the summing network 42 will cause the output $e_o$, of the set up amplifier to equal zero.

The second step of standardization is performed with the identical pair of the second sample positioned in the X-ray beams from gauges 20 and 21, and with standardize relay K1 deenergized and K2 energized. The gain of the variable gain amplifier 45 is adjusted by means of the gain select potentiometer 46 until the output $e_o$ of the set up amplifier 41 is some selected predetermined value at the high end of the output response curve. For this purpose the summing network 47 is provided, and a standard negative voltage, such as −8 volt is applied through the NO contact of K2, and the NC contact of K1 to the summing network 47 where the −8 volts is substracted from the input signal $e_1$, applied to the summing network. The slider of the potentiometer 46 is adjusted until the output voltage $e_o$ from the summing network 47 equals zero. With $e_o$ set to zero, the $e_1$ must be equal to $e_2$, with the result that $e_1$ must be equal to 8 volts.

After standardizing steps 1 and 2 have been completed, the standardize relays K1 and K2 are deenergized thus setting $e_2$ equal to zero. The gauges 20 and 21 are moved back over the ply 19 and the system is ready to operate. The standardization steps for the upper and lower gauges 20 and 21 are performed in similar manner. Although the steps of performing standardization may be performed manually it is equally within the scope of this invention that standardization may be performed automatically using appropriate timing and servo means.

The output signal from the set up amplifier 41 is fed into a summing network 50. The summing network 50 is provided in order that an offset voltage corresponding to a point X on the voltage response curve C (indicated in FIG. 3), at a selected target thickness, $t_T$, may be offset from the voltage being fed into the summing network 50 from the set up amplifier 41. An offset voltage selecting means 52 receives an input from a grade select switch 54 which has multiple positions for providing plural selected inputs to various components of the invention including the offset voltage selecting means 52, and the gain select means 53 as well as to components in the solution network 55 subsequently to be described. The offset select means 52 may be a multiplying digital-to-analog converter (MDAC) having a constant analog input reference voltage and an output voltage selectable by a digital input signal to the MDAC. The grade selection is achieved by the digital input signal. Each selected value of the digital input signal provides a predetermined offset voltage corresponding to a selected grade of ply being produced by the apparatus indicated in FIG. 1. The voltage output from the summing amplifier 50 is thus a voltage deviation from the selected target thickness.

A variable gain amplifier 51 receives the output signal from summing network 50 and is provided for the purpose of selecting a limited range on the voltage response curve C (See FIG. 3) to which the system is sensitive. In normal operating conditions the variation of the thickness of rubber on each side of the reinforcing cord from a selected target thickness will not be very great, therefore, the gain of the variable gain amplifier 51 may be adjusted to provide full scale sensitivity of the thickness meter or recorder 33 and 34 for a small portion of the signal response curve C centered on the target thickness $t_T$. The gain select means 53 may be a MDAC. The analog input signal to variable gain amplifier 51 is the output signal from summing network 50 and the gain is set by the digital input information to the MDAC. The digital input information is provided by way of the grade select switch 54. The digital input information selects the gain of variable gain amplifier 51.

The output voltage from the variable gain amplifier 51 of the upper gauge signal processor 35 is expressed by the following equation:

$$e_{LT} = K \left[ \Delta t_t + \frac{b}{a} \Delta t_b \right] \quad (3)$$

where:
$e_{LT}$ is the output voltage from the variable gain amplifier;
$K$ is a constant;
$\Delta t_t$ is the deviation of the thickness of the upper layer of rubber from a target thickness;
$\Delta t_b$ is the deviation of the thickness of the bottom layer of rubber from a target thickness and
$a$ and $b$ are as previously defined with respect to equation 1.

The signal processor 36 for the lower measuring head is similar to the signal processor for the upper measuring head 35 for which reason it is shown only in block form in FIG. 3. The signal processor 36 receives inputs 52b and 53b from the grade select switch 54 for adjustment of an offset select means and a gain select means respectively in like manner as described in reference to the signal processor 35. The offset select means in the lower head signal processor provides an offset voltage to a summing network corresponding to the network 50 which represents a target thickness for the rubber on the bottom side (i.e. the sensor side) of the ply 19. The gain select means in the lower head signal processor adjusts the gain in an amplifier corresponding to the variable gain amplifier 51 for a specific sensitivity based on the grade of the tire ply being produced in like manner as described in reference to the signal processor 35. The output signal from the lower head signal processor 36 is expressed by the following equation:

$$e_{LB} = K \left[ \Delta t_b + \frac{b}{a} \Delta t_t \right] \quad (4)$$

where:

$e_{LB}$ is the voltage output from the lower head signal processor, and the other terms have been described in reference to equation 3. By solving equations 3 and 4 simultaneously for $\Delta t_t$ and $\Delta t_b$ it can be shown that:

$$\Delta t_t = \frac{a^2}{a^2-b^2} \frac{1}{K} \left[ e_{LT} - \frac{b}{a} e_{LB} \right] \quad (5)$$

and $$\Delta t_b = \frac{a^2}{a^2-b^2} \frac{1}{K} \left[ e_{LB} - \frac{b}{a} e_{LT} \right] \quad (6)$$

but $K$ is a gain factor set into the variable gain amplifier 51 of both the upper and lower measuring head signal processors 35 and 36 such that:

$$K = \frac{E_R}{\Delta T_o} \frac{a^2}{a^2-b^2} \quad (7)$$

where, $E_R$ is a selected constant voltage response for the maximum rubber thickness deviation $\Delta T_o$, from a target thickness on either side of the ply 19 which the gauges 20 and 21 are likely to encounter. Therefore, $E_R/\Delta T_o$ is a constant sensitivity factor representing volts per unit of thickness.

Substituting the value of $K$ given in equation 7 in equations 5 and 6 it will be seen that:

$$\Delta t_t = \frac{\Delta T_o}{E_R} \left[ e_{LT} - \frac{b}{a} e_{LB} \right] \quad (8)$$

and $$\Delta t_b = \frac{\Delta T_o}{E_R} \left[ e_{LB} - \frac{b}{a} e_{LT} \right] \quad (9)$$

The solution network 55 is designed to solve equations 3 and 4 simultaneously to obtain output signals $W_T$ and $W_B$ which are related to the thickness of the rubber on the top and bottom sides of the ply 19. It includes a pair of summing networks 56 and 57 connected between the output lines 62 and 63 of the upper and lower measuring head signal processors 35 and 36 respectively and the output lines 31 and 32 of the solution network respectively. Variable gain networks 58 and 60 are provided to supply to the summing amplifiers 56 and 57 respectively an offset voltage equal to $b/a$ times the output signal from the opposite signal processor. The summing amplifier 56 thus produces an output signal such that:

$$W_T = e_{LT} - \frac{b}{a} e_{LB} ; \quad (10)$$

and the summing amplifier 57 produces an output signal such that:

$$W_B = e_{LB} - \frac{b}{a} e_{LT} . \quad (11)$$

The gain of variable gain amplifier 58 is adjusted by gain select means 59 which is controlled by gain selection actuator 59a, in the form of a MDAC in as the previously described offset select MDAC, associated with the grade select switch 54. Similarly the gain of variable gain amplifier 60 is adjusted by gain select means 61.

In the system described with respect to FIG. 3 the output signal $W_T$ appearing on line 31 is related to the deviation, $\Delta t_t$, of the thickness of the upper layer of rubber by the sensitivity constant, $$\frac{E_R}{\Delta T_o}$$

thus:

$$W_T = \frac{E_R}{\Delta T_o} \cdot \Delta t_t \quad (12)$$

Likewise the output signal $W_B$ appearing on line 32 is related to the deviation, $\Delta t_b$, of the thickness of the bottom layer of rubber by the same sensitivity constant, thus:

$$W_B = \frac{E_R}{\Delta T_o} \cdot \Delta t_b \quad (13)$$

Thus it will be seen that the solution network 55 performs automatically the simultaneous solution of equations 3 and 4.

The solution network 55 may be modified in various ways which will be obvious to one skilled in the art in order to solve simultaneously the equations representing the signals appearing on lines 62 and 63 and obtain a pair of output signals functionally related to the thickness of the rubber on opposite sides of the ply 19. For example, it is not necessary that the gain amplifier 51 be used to apply all of the gain necessary for multiplying the signal from the offset amplifier 50 by the several constant factors represented by equation 7. Instead additional gain amplifiers may be included in the upper and lower measuring head signal channels within the solution network for applying gain factors corresponding to a portion of the required constant $K$ represented by equation 7.

It should further be noted that offset amplifier 50 and the gain amplifier 51 function as a linearizing network since together they limit the output response to a small substantially linear portion of the response curve $C$. The gain amplifier 51 sets the slope or sensitivity of the linearized portion of the curve.

Figure 5:
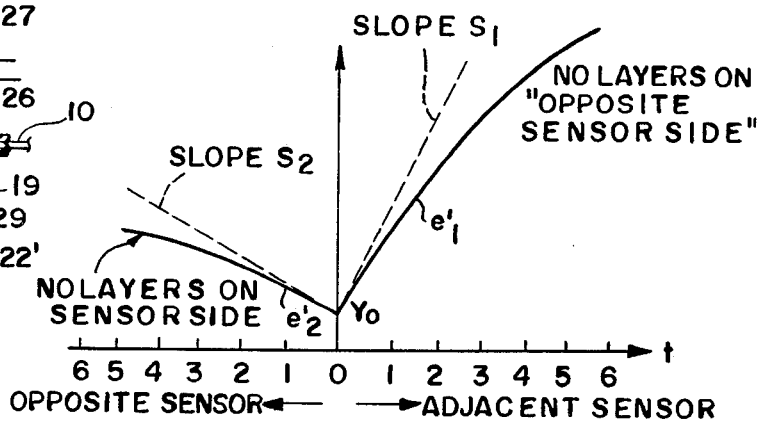
FIG. 5 is a graph illustrating the voltage response of the gauges of this invention as layers of rubber are added to a layer of steel cords with all of the rubber removed.

The output signals $W_T$ and $W_B$ may be treated in several different ways to obtain information desired by the tire industry. First, the signals are fed to indicators 33 and 34 illustrated in FIG. 1 which give indication of the top and bottom thicknesses of rubber on each side of the reinforcing cords 10. Further the signals are preferably combined in a summing amplifier 65 to give a signal representing $W_T + W_B$ corresponding to total thickness of the layers on opposite sides of the reinforcing cord. Also it is usually desired to provide either a ratio computer 66 for producing a signal $W_T/W_B$ corresponding to the relative position of the cord within the ply 19, or a balance computer including a phase inverting unity gain amplifier 67 and a summing amplifier 68 for producing an output signal corresponding to $W_T-W_B$. Since both the ratio computer 66 and the balance computer are usually not required, FIG. 3 indicates that they may be alternatively connected at points 69 and 70. The total ply weight can be indicated by taking the output of summing network 65 and adding to it by calibration of a meter or a separate input representing the weight of the cords. The same approach can be used to obtain total ply thickness, by adding to the output of summing network 65 the cord thickness. The cord weight and thickness are quantities that are known for each grade of ply to be made. For example, as shown in FIG. 5 summing network 125 provides an output indicating total ply thickness or weight by adding $W_B$, $W_T$, and $W_C$, the thickness or weight of the cords. The $W_C$ input is produced by signal generator 126 and the appropriate signal representing $W_C$ for each ply is to be selected by grade select switch 54 as shown by the dotted line.

It has been mentioned heretofore that field tests are run when setting up the apparatus of this invention in order that the grade switch 54 will provide the required inputs to the signal processors 35 and 36 and to the solution network 55 for each grade of tire ply which the specific industrial plant is likely to manufacture. With the grade switch 54 thus set up it is merely necessary when the plant wishes to change the type of ply it is producing to switch the grade switch to a position corresponding to the new grade of ply that is to be produced. The field tests require that samples corresponding to each tire grade be provided. The term grade as used herein defines the total ply thickness, the number of cords per inch, and the cord size. Each grade sample used in performing the field tests will be a standard for the particular grade having the required total ply thickness, the required number of cords and the required cord size. In addition the cords will be properly centered in the ply so that there are equal thicknesses of rubber on each side of the ply.

A standard sample having the desired wire cord configuration and the desired rubber thickness on each side of the cords is placed in a measuring position centrally between the heads 20 and 21. The sample may have any value of F (i.e. fill factor) and C (composition factor). Since the sample has the desired rubber thickness on each side of the ply, then $\Delta t_t$ and $\Delta t_b$ are equal to zero. Adjustments are made first to one signal processor and then to the other. Consider first adjustments to the upper signal processor 35. The offset select means 52 is adjusted to set an offset voltage $E_{OFF}$ into the summing amplifier 50 which offsets the output voltage $e_o$ from the set up amplifier 41 in order that the output, $e_{LB}$, from the gain amplifier 51 is equal to zero.

Now $\Delta t_t$ is increased a known amount by adding rubber or mylar, to the top side of the cord. The gain of amplifier 51 is then adjusted to give a predetermined sensitivity to rubber on the top side of the cord. For example, it may be desired for $e_{LT}$ to go from 0 to 4 volts (one half of full scale of a particular recorder) as the increment of rubber on the top side of ply is increased from 0 to 5 mils. Then $e_{LT}$, for $\Delta t_t$ equal to 5 mils would be made to equal 4 volts by adjusting the gain select means 53. The sensitivity factor $E_R/\Delta T_o$ previously described is thus established.

The signal processor for the lower measuring head 36 is adjusted in a similar manner by first adjusting the offset voltage being applied to the summing amplifier 50 in the lower measuring head signal processor using the selected standard sample, and then adjusting the gain of variable gain amplifier 51 using the same sample as used with the upper head signal processor gain calibration but with the sample turned over so that the added rubber corresponds to a $\Delta t_b$.

The gain $b/a$ in network 58 of solution network 55 is selected such that adding an increment of rubber such, for example, as one mil thickness (mylar or other suitable equivalent or rubber may be used for this purpose) on the bottom side of the ply produces no change in the signal $W_T$. Similarly, the gain factor $b/a$ in network 60 is selected such that adding an increment of rubber on the top side of the ply produces no change in the signal $W_B$.

One way that may be used to predetermine the appropriate value of the sensitivity constants $a$ and $b$ for the solution network 55 is to plot the response of one of the gauges 20 or 21 upon the addition of successive layers of rubber of equal thickness to an inner ply of reinforcing cord with all rubber removed. The layers representing a predetermined increment of known thickness may be simulations of rubber instead of an all rubber layer, and for this purpose combinations of rubber and mylar have been found satisfactory and easier to handle than all rubber layers.

First a plot of the sensor response to the addition of incremental layers on the sensor side of the reinforcing cord with no rubber on the side opposite the sensor is made, as shown in FIG. 5. The curve $e_1'$ on the right hand side of the ordinate axis is made by connecting the points plotted for each incremental layer added on the sensor side. The point $Y_o$ on the ordinate axis is the signal response taken when the reinforcing cords are bare of rubber.

Secondly, a plot is made of the sensor response to the addition of incremental layers on the side opposite the sensor, with the side of the reinforcing cord adjacent the sensor bare of rubber. The curve $e_2'$ to the left of the ordinate axis is made by connecting the points plotted for each incremental layer added to the side opposite the sensor.

The sensor response may be represented by the equation:

$$e_1' = Y_o [1 + k(1 - e^{-(at_t + bt_b + F)(1-gc)})] \quad (16)$$

The value of $Y_o$ may be readily determined from the plot since it is the sensor response when the reinforcing cords are bare with zero layers of rubber applied to both sides. The value of the proportionality constant $k$ can also be determined. The value of $Y_o$ and $k$ may not vary significantly from one grade of ply to another thus values determined for some preceeding product may be satisfactory.

The differential of equation 16 is:

$$\left| \frac{de_1}{dt_t} \right| = y_o k (1-ge) \, a \, e^{-(at_t + bt_b + F)(1-gc)} \quad (17)$$

However, $S_1$ is the slope of the curve $e_1$, with $t_t = t_b = C = F = 0$
Therefore $$S_1 = \left[\left[\frac{de_1}{dt_t}\right]\right]_{t_t = t_b = F = C = O} = Y_o k a$$

Transposing, $$a = \frac{S_1}{kY_o} \quad (18)$$

In a similar calibration, $b$ can be determined from the equation $$b = \frac{S_2}{kY_o} \quad (19)$$

These are the approximate values of a and b to be used in computing $b/a$ for use in the solution network.

Reference is made at this point to the aforesaid pending application Ser. No. 181,836 which discloses an X-ray gauge having reference and measurement ionization chambers from which current signals are obtained. Electrometers are provided to convert the detected current signals to voltage signals and a ratio circuit is provided in order to eliminate the affect of drifting of the X-ray source upon the measurement signal. Also an offset means and a variable gain amplifier are provided for standardization. The electrometers, ratio circuit and means for standardization disclosed in application Ser. No. 181,836 correspond to the electrometers 37 and 38, the ratio circuit 40 and the setup amplifier 41 respectively included as components in the present invention. The aforesaid components are included in the description of a preferred embodiment of it being recognized that other components and arrangements can be used, within the scope of the invention. It should be recognized also that the apparatus for practicing the invention can use a programmed digital computer, such as for signal processing, in combination with the appropriate sensors.

While a preferred embodiment of the present invention has been described other modifications may become apparent to those skilled in the art to which the invention relates. Accordingly it is not desired to limit the invention to this disclosure, and various modifications and equivalents may be resorted to, falling within the spirit and scope of the invention as claimed.

What is claimed is:

1. A method for measuring the thicknesses of a first material applied to opposite sides of reinforcing cords of a second material, the material of the reinforcing cords having a high effective atomic number relative to the atomic number of the material applied to the opposite sides of the reinforcing cords, comprising the steps of directing X-ray radiations to both sides of the ply, said X-ray radiations and the ply producing backscattered radiation on each side of the ply that is a function of the thickness of the first material on both sides of the ply, sensing the backscattered radiation on each side of the ply and obtaining first and second signals, the first signal being obtained from one side of the ply and the second signal being obtained from the other side of the ply, both of said signals being functionally related to the thicknesses of the first material on both sides of the ply, combining the first and second signals to obtain a third signal that is representative of the thickness of rubber on one side of the cords and substantially independent of changes in the thickness of rubber on the opposite side of cords, and combining the first and second signals to obtain a fourth signal, said fourth signal being representative of the thickness of rubber on the opposite side of the cords and substantially independent of changes in the thickness of rubber on said one side of the cords.

2. The method according to claim 1 wherein said X-ray radiations are of an energy level selected to minimize sensitivity of the first and second signals to composition changes in the rubber and to provide substantial absorption of said radiations by said cords.

3. The method according to claim 1 wherein said first and second signals are combined by combining the first signal with the second signal combined with the factor $b/a$ to obtain said third signal, and combining the second signal with the first signal combined with said factor $b/a$ to obtain said fourth signal, wherein b is a predetermined sensitivity factor relating the response of backscatter radiations from a layer of rubber on the side of the reinforcing cord opposite the backscatter radiation sensing and a is a predetermined sensitivity factor relating the response of backscatter radiations from the layer of rubber on the side of the cords where the backscatter radiation is sensed.

4. A method for measuring the thicknesses of rubber on opposite sides of a steel cord reinforced rubber ply, comprising directing X-ray radiations to both sides of the tire ply, said X-ray radiations and the ply producing backscattered radiation on each side of the play that is a function of the thickness of the first material on both sides of the ply, sensing the backscattered radiations on each side of the ply and obtaining first and second signals which are functionally related to the thicknesses of rubber on both sides of the steel cord, combining the first and second signals to obtain a third signal that is representative of the thickness of rubber on one side of the cords and substantially independent of changes in the thickness of rubber on the opposite side of the cords, and combining the first and second signals to obtain a fourth signal, said fourth signal being representative of the thickness of rubber on the opposite side of the cords and substantially independent of changes in the thickness of rubber on said one side of the cords.

5. The method according to claim 4 wherein said X-ray radiations are of an energy level selected to minimize sensitivity of the first and second signals to composition changes in the rubber and to provide substantial absorption of said radiations by said cords.

6. The method according to claim 4 wherein said first and second signals are combined by combining the first signal with the second signal combined with the factor $b/a$ to obtain said third signal, and combining the second signal with the first signal combined with said factor $b/a$ to obtain said fourth signal, where $b$ is a predetermined sensitivity factor relating the response of backscatter radiations from a layer of rubber on the side of the reinforcing cord opposite the backscatter radiation sensing and is a predetermined sensitivity factor relating the response of backscatter radiations from the layer of rubber on the side of the cord where the backscatter radiation is sensed.

7. Apparatus for measuring the thicknesses of rubber on opposite sides of a cord reinforced rubber ply comprising a first means for applying X-ray radiations to one side of the ply, a second means for applying X-ray radiations to the opposite side of the ply, first detector means for sensing the backscatter radiations from said one side of the ply and producing a first signal which is functionally related to the thicknesses of rubber on both sides of the ply, second detector means for sensing the backscatter radiations from the opposite side of the ply and producing a second signal which is functionally related to the thicknesses of rubber on both sides of the ply, means responsive to said first and second signals to obtain third and fourth signals, said third signal being obtained from combining said first and second signals, and said fourth signal being obtained from combining said first and second signals, said third and fourth signals being representative of the thickness of rubber on the one side of the cord and sustantially independent of changes in the thickness of rubber on the opposite side of the cords and representative of the thickness of rubber on the other side of the cord and substantially independent of changes in the thickness of rubber on said one side of said cords, respectively.

8. The apparatus according to claim 7 wherein said combining means combines said first signal with said second signal and the factor $b/a$ to obtain said third signal, and combines said second signal and said first signal and said factor $b/a$ to obtain said fourth signal, wherein $b$ is a predetermined sensitivity factor relating the response of one of said detectors to backscatter radiations from a layer of rubber on the side of the reinforcing cord opposite said one detector and $a$ is a pretermined sensitivity factor relating the response of said one detector to backscatter radiations from the layer of rubber on the side of the cords adjacent said one detector.

9. The apparatus according to claim 7 wherein said combining means comprises a solution network including means for offsetting from the processed first signal the processed second signal multiplied by the factor $b/a$ to obtain said third signal, and means for offsetting from the processed second signal and processed first signal multiplied by said factor $b/a$ to obtain said fourth signal, wherein $b$ is a predetermined sensitivity factor relating the response of one of said detectors to backscatter radiations from a layer of rubber on the side of the reinforcing cord opposite said one detector and $a$ is a predetermined sensitivity factor relating the response of said one detector to backscatter radiations from the layer of rubber on the side of the cords adjacent said one detector.

10. The apparatus according to claim 7 wherein said first means for applying X-ray radiations and said first detector means are housed in a first measuring head on one side of said ply, and said second means for applying X-ray radiations and said second detector means are housed in a second measuring head on the opposite side of said ply, together with traversing means for transversely scanning said ply.

11. The apparatus set forth in claim 7 wherein said first and second detector means are similar and comprise a closed ionization chamber having a pressurized ionizable gas and a detector electrode within said chamber, the ionizable gas and the pressure of said gas being selected for optimum sensitivity to the backscatter X-ray radiations from said ply.

12. The apparatus set forth in claim 11 wherein said ionization chamber includes a window adjacent to said ply which is substantially transparent to backscatter radiations and nontransparent to fluorescent radiations from said ply.

13. The apparatus set forth in claim 7 wherein said first and second means for applying X-ray radiations include isotope sources of X-ray radiation.

14. The apparatus set forth in claim 7 wherein said first and second means for applying X-ray radiations each includes a reguleted X-ray tube source, and a closed reference ionization chamber interposed between said source and said ply, said reference ionization chamber having windows which are substantially transparent to the radiations from said source and containing an ionizable gas and a reference signal detection anode responsive to the ionization of said gas within said reference chamber resulting from the X-ray radiation from said source, said first and second detector means each including a closed measuring ionization chamber surrounding and coaxial with a reference chamber on the same side of said ply, each measuring ionization chamber containing a pressurized ionizable gas and a measurement signal detection electrode, the ionizable gas and the pressure of said gas within said measuring ionization chamber being selected for optimum sensitivity to backscatter X-ray radiations from said ply.

15. The apparatus according to claim 7 wherein said first means for applying X-ray radiations and said first detector means are housed in a first measuring head on one side of said ply, and said second means for applying X-ray radiations and said second detector means are housed in a second measuring head on the opposite side of said ply, together with traversing means for transversely scanning said ply, said ply being a continuously moving strip proceeding from a forming apparatus.

16. The apparatus according to claim 7 wherein the cords of said ply extend longitudinally with respect to said strip and said radiation applying means and said first and second detector means are reciprocated transversely with respect to said cords, each of said first and second detector means comprising a window shaped so that the X-ray beam passing through a window has a smaller width in the longitudinal direction of said ply through the center of said beam, and a greater width at the leading and trailing edges of said beam in the direction of scan in order to minimize sensitivity of each of said detector means to the dimensions of said cords.

17. The apparatus according to claim 16 wherein said windows are circular.

18. The apparatus according to claim 7 wherein the first means for applying X-ray radiations and said first detector means are offset from the second means for applying X-ray radiations and said second detector means in the longitudinal direction of said ply so that the X-ray beams applied to one side of said ply will not be sensed by the detector means on the other side of said ply.

19. The apparatus according to claim 7 together with means for processing said first signal including means for stabilizing said first signal against fluctuations in the intensity of X-rays from said first means for applying X-ray radiations, means for standardizing the stabilized first signal to make the stabilized first signal repeatable for selected standard samples, and means for offsetting and linearizing said first signal after it has been stabilized and standardized, means for processing said second signal in the same manner as said means for processing said first signal and including similar stabilizing means, standardizing means and offsetting and linearizing means for said second signal.

20. The apparatus according to claim 19 wherein said offsetting and linearizing means comprises a summing means for offsetting a selected offset voltage representative of the target thickness of the layer of rubber covering the reinforcing cord on the detector side of the ply from the standardized signal from said detector, offset selecting means for selecting said offset voltage for different grades of ply, a variable gain amplifier means for amplifying the offset signal by a preselected gain factor, and gain select means for adjusting the gain of said variable gain amplifier for different grades of ply.

21. The apparatus according to claim 20 wherein said combining means comprises a solution network includes means for offsetting from the processed first signal the processed second signal multiplied by the factor $b/a$ to obtain said third signal, and means for offsetting from the processed second signal the processed first signal multiplied by said factor $b/a$ to obtain said fourth signal, wherein $b$ is a predetermined sensitivity factor relating the response of one of said detectors to backscatter radiations from a layer of rubber on the side of the reinforcing cord opposite said one detector and $a$ is a predetermined sensitivity factor relating the response of said one detector to backscatter radiations from the layer of rubber on the side of the cords acjacent said one detector.

22. The apparatus according to claim 21 together with a multiposition grade switch means in which information is stored relative to a different grade of ply for each position of said grade switch, said information including the offset factors representative of the target thickness for the rubber layers on each side of the reinforcing cord, the gain factor for said variable gain amplifiers in each of said processing means, and the factor $b/a$.

23. The apparatus according to claim 7 together with means for selecting grade information on each ply, said grade selecting means storing information for said signal combining means that are selected for each grade of ply measured.

24. The apparatus according to claim 7 wherein said combining means provides a signal that is produced by the comparison of said third and fourth signals that is responsive to the position of the cords in the ply.

25. The apparatus according to claim 7 wherein said combining means provides a signal that is produced by the addition of said third and fourth signals that is responsive to the total thickness of rubber in said ply.

26. The apparatus according to claim 7 wherein said combining means provides a fifth signal that is produced by the addition of said third signal, fourth signal, and a sixth signal that is representative of the thickness of said cords, said fifth signal being responsive to the total ply thickness.

* * * * *